(12) United States Patent
Sakai et al.

(10) Patent No.: US 11,325,593 B2
(45) Date of Patent: May 10, 2022

(54) RISK ESTIMATION APPARATUS AND AUTOMATED DRIVING APPARATUS

(71) Applicant: HONDA MOTOR CO., LTD., Tokyo (JP)

(72) Inventors: Rei Sakai, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 16/823,845

(22) Filed: Mar. 19, 2020

(65) Prior Publication Data

US 2020/0298845 A1 Sep. 24, 2020

(30) Foreign Application Priority Data

Mar. 19, 2019 (JP) .............................. JP2019-051054

(51) Int. Cl.
*B60W 30/09* (2012.01)
*B60W 40/04* (2006.01)

(52) U.S. Cl.
CPC ............ *B60W 30/09* (2013.01); *B60W 40/04* (2013.01); *B60W 2420/40* (2013.01)

(58) Field of Classification Search
CPC ... B60W 30/09; B60W 40/04; B60W 2420/40
See application file for complete search history.

(56) References Cited

U.S. PATENT DOCUMENTS

| | | | |
|---|---|---|---|
| 2007/0154063 A1* | 7/2007 | Breed | B60R 21/01538 382/100 |
| 2015/0298693 A1* | 10/2015 | Uechi | B60T 7/22 701/70 |
| 2017/0323568 A1* | 11/2017 | Inoue | B60W 30/146 |
| 2017/0369055 A1* | 12/2017 | Saigusa | B60W 30/18163 |
| 2019/0088136 A1* | 3/2019 | Nagata | G08G 1/166 |
| 2020/0047750 A1* | 2/2020 | Likhachev | G05D 1/0217 |
| 2020/0108831 A1* | 4/2020 | Park | B60W 30/162 |
| 2021/0225169 A1* | 7/2021 | Baba | G01S 13/931 |

FOREIGN PATENT DOCUMENTS

JP 2016-91039 A 5/2016

* cited by examiner

*Primary Examiner* — Mahmoud S Ismail
*Assistant Examiner* — Gabriel Anfinrud
(74) *Attorney, Agent, or Firm* — WHDA, LLP (57) ABSTRACT

An automated driving apparatus acquires a position relation between a vehicle in front and a host vehicle based on peripheral state data D_info. When an intervehicular distance D1 between the host vehicle and the vehicle in front in a front-and-back direction has a value smaller than a first predetermined value D1ref, it is estimated that a risk of appearance Risk_ap is low compared with a case in which the distance in the front-and-back direction has a value equal to or larger than the first predetermined value D1ref.

5 Claims, 9 Drawing Sheets

RISK ESTIMATION APPARATUS AND AUTOMATED DRIVING APPARATUS

CROSS REFERENCES TO RELATED APPLICATIONS

The present application claims priority under 35 U.S.C. § 119 to Japanese Patent Application No. 2019-051054, filed Mar. 19, 2019, entitled "Risk Estimation Apparatus and Automated Driving Apparatus." The contents of this application are incorporated herein by reference in their entirety.

BACKGROUND

1. Field

The present disclosure relates to, for example, risk estimation apparatuses which estimate a risk of appearance of a traffic participant when a host vehicle passes through a peripheral area of a stopped vehicle.

2. Description of the Related Art

Conventionally, as a danger prediction apparatus which predicts a danger at the time of vehicle driving, one described in Japanese unexamined Patent Application Publication No. 2016-091039 has been known. In this danger prediction apparatus, a degree of danger at the time of vehicle driving is predicted based on information about observation of a peripheral state of a host vehicle by using an observation logic expression or the like.

In recent years, an automated driving apparatus which performs automated driving control of a vehicle has been desired. In this automated driving apparatus, on condition that a stopped vehicle and a traveling vehicle are present in a traveling direction of the host vehicle, the degree of a risk to the host vehicle is required to be finely estimated in accordance with a position relation among the host vehicle, the stopped vehicle, and the traveling vehicle, and so forth. By contrast, in the technique described in Japanese unexamined Patent Application Publication No. 2016-091039, since the position relation among the host vehicle, the stopped vehicle, and the traveling vehicle, and so forth are not estimated, it is difficult to appropriately estimate the degree of a risk when the host vehicle passes through the periphery of the stopped vehicle, in particular, the degree of a risk of appearance of a traffic participant in a front area of the host vehicle.

SUMMARY

The present disclosure provides, for example, a risk estimation apparatus capable of appropriately estimating the degree of a risk of appearance of a traffic participant when a host vehicle passes through a peripheral area of a stopped vehicle.

A first aspect of the present disclosure is directed to a risk estimation apparatus 1 which estimates, when a stopped vehicle 10 is present in a predetermined area in a traveling direction of a host vehicle 3 and a vehicle in front 11 traveling a peripheral area (first peripheral area A1) of the stopped vehicle 10 in the traveling direction is present ahead of the host vehicle 3, a risk of appearance Risk_ap of a traffic participant (pedestrian M) in a front area of the host vehicle 3 when the host vehicle 3 passes through the peripheral area (first peripheral area A1) of the stopped vehicle 10. The risk estimation apparatus 1 includes: a peripheral state data acquisition unit/acquisitor (state detection apparatus 4) which acquires peripheral state data D_info indicating a peripheral state in the traveling direction of the host vehicle 3; a position relation acquisition unit/acquisitor (ECU 2) which acquires a position relation between the vehicle in front 11 and the host vehicle 3 based on the peripheral state data D_info; and a risk estimation unit/estimator (ECU 2, STEP 41 to step 45) which estimates, when a distance (intervehicular distance D1 in a front-and-back direction) between the host vehicle 3 and the vehicle in front 11 in the traveling direction has a value smaller than a first predetermined value D1ref, that, the risk of appearance Risk_ap is low compared with a case in which the distance in the traveling direction has a value equal to or larger than the first predetermined value D1ref. With this configuration, the host vehicle can be operated based on the estimated risk of appearance of the traffic participant in the front area of the host vehicle According to the risk estimation apparatus of the first aspect, the peripheral state data indicating the peripheral state in the traveling direction of the host vehicle is acquired and, based on this peripheral state data, the position relation between the vehicle in front and the host vehicle is acquired. And, when the distance between the host vehicle and the vehicle in front in the traveling direction has a value smaller than the first predetermined value, it is estimated that the risk of appearance is low compared with a case in which the distance in the traveling direction has a value equal to or larger than the first predetermined value.

In this case, the vehicle in front travels the peripheral area of the stopped vehicle in the traveling direction ahead of the host vehicle. Therefore, if a traffic participant is present in the peripheral area of the stopped vehicle, the traffic participant recognises the presence of the vehicle in front prior to the host vehicle. Thus, if the distance between the host vehicle and the vehicle in front in the traveling direction is short, it can be estimated that the risk of appearance of a traffic participant is low compared with the case in which this distance is long. Therefore, by appropriately setting this first predetermined value, the degree of the risk of appearance of a traffic participant can be appropriately estimated in accordance with the length of the distance between the host vehicle and the vehicle in front in the traveling direction ("traffic participant" in the specification refers to a pedestrian, an occupant of the stopped vehicle, a driver of a light vehicle, or the like, and "front area of the host vehicle" in the specification refers to an area ahead of the host vehicle in the traveling direction).

According to a second aspect of the present disclosure, in the risk estimation apparatus 1 according to the first aspect, the position relation acquisition unit may acquire a position relation between the vehicle in front 11 and the stopped vehicle 10 based on the peripheral state data D_info, and when a distance D2 between the vehicle in front 11 and the stopped vehicle 10 in a vehicle-width direction has a value smaller than a second predetermined value D2ref, the risk estimation unit may estimate that the risk of appearance Risk_ap is low compared with a case in which the distance D2 in the vehicle-width direction has a value equal to or larger than the second predetermined value D2ref (STEP 42 to STEP 44).

According to the risk estimation apparatus of the second aspect, when the distance between the vehicle in front and the stopped vehicle in the vehicle-width direction has a value smaller than the second predetermined value, it is estimated that the risk of appearance is low compared with the case in which the distance in the vehicle-width direction has a value equal to or larger than the second predetermined value. Generally speaking, if a traffic participant is present in the peripheral area of the stopped vehicle, to avoid this, it is estimated that the vehicle in front travels so that the distance between the vehicle in front and the stopped vehicle in the vehicle-width direction is long compared with a case in which no traffic participant is present. That is, the distance between the vehicle in front and the stopped vehicle in the vehicle-width direction is estimated as indicating the presence or absence of a traffic participant in the peripheral area of the stopped vehicle. Therefore, by appropriately setting this second predetermined value, the degree of the risk of appearance of a traffic participant can be appropriately estimated in accordance with the comparison result between the distance between the vehicle in front and the stopped vehicle in the vehicle-width direction and the second predetermined value.

According to a third aspect of the present disclosure, the risk estimation apparatus 1 according to the first or second aspect may further include a lighting determination unit/determinator (ECU 2) which determines whether a headlamp of the vehicle in front 11 has been lit. If the headlamp of the vehicle in front 11 has been lit, the risk estimation unit may estimate that the risk of appearance Risk_ap is low compared with a case in which the headlamp of the vehicle in front 11 has not been lit (STEP 46 to STEP 50).

According to the risk estimation apparatus of the third aspect, if the headlamp of the vehicle in front has been lit, it is estimated that the risk of appearance is low compared with the case in which the headlamp of the vehicle in front has not been lit. In this case, if the headlamp of the vehicle in front has been lit, the degree of recognizing the vehicle in front is higher than that at the time of non-lit, and it can thus be estimated that the risk of appearance of a traffic participant is decreased. Therefore, the degree of the risk of appearance of a traffic participant can be appropriately estimated in accordance with the presence or absence of lighting of the headlamp of the vehicle in front.

According to a fourth aspect of the present disclosure, the risk estimation apparatus 1 according to the third aspect may further include a luminance acquisition unit/acquisitor (state detection apparatus 4) which acquires a luminance Lu around the host vehicle 3. If the luminance Lu is smaller than a predetermined luminance Lref on condition that the headlamp of the vehicle in front 11 has been lit, the risk estimation unit may estimate that the risk of appearance Risk_ap is low compared with a case in which the luminance Lu is equal to or larger than the predetermined luminance Lref on condition that the headlamp of the vehicle in front 11 has been lit (STEP 47 to STEP 45).

According to the risk estimation apparatus of the fourth aspect, if the luminance is smaller than the predetermined luminance on condition that the headlamp of the vehicle in front has been lit, it is estimated that the risk of appearance is low compared with the case in which the luminance is equal to or larger than the predetermined luminance on condition that the headlamp of the vehicle in front has been lit. In this case, if the luminance is low, the degree of recognizing the headlamp is further increased compared with a case in which the luminance is high, and it can thus be estimated that the risk of appearance of a traffic participant is further decreased. Therefore, by appropriately setting this predetermined luminance, the degree of the risk of appearance of a traffic participant can be appropriately estimated in accordance with the comparison result between the Luminance and the predetermined luminance.

According to a fifth aspect of the present disclosure, in the risk estimation apparatus 1 according to any one of the first to fourth aspects, the position relation acquisition unit may further acquire a vehicle speed of the vehicle in front 11 based on the peripheral state data D_info, and when a deceleration DEC of the vehicle in front 11 when traveling the peripheral area (first peripheral area A1) becomes equal to or larger than a predetermined deceleration DECref, the risk estimation unit may estimate that the risk of appearance Risk_ap is high compared with a case in which the deceleration DEC is smaller than the predetermined deceleration DECref (STEP 40 to STEP 51).

According to the risk estimation apparatus of the fifth aspect, if the deceleration when the vehicle in front travels the peripheral area becomes equal to or higher than the predetermined deceleration, it is estimated that the risk of appearance is high compared with the case in which the deceleration is smaller than the predetermined deceleration. Generally speaking, if the deceleration when the vehicle in front travels the peripheral area of the stopped vehicle is large, it is estimated that the possibility that the vehicle in front has recognised a traffic participant and decelerated. Thus, it can be estimated that the risk of appearance of a traffic participant is high compared with the case in which the deceleration is small. Therefore, by appropriately setting this predetermined deceleration, the degree of the risk of appearance of a traffic participant can be appropriately estimated in accordance with the comparison result between the deceleration when the vehicle in front passes on the side of the stopped vehicle and the predetermined deceleration.

A sixth aspect of the present disclosure is directed to a risk estimation apparatus 1 which estimates, when a stopped vehicle 10 is present in a predetermined area in a traveling direction of a host vehicle 3 on an opposing lane side of a road where the host vehicle 3 is traveling and an oncoming vehicle 12 traveling in an opposite direction of the traveling direction of the host vehicle 3 is present on the opposing lane side, a risk of appearance Risk_ap of a traffic participant in a front area of the host vehicle 3 when the host vehicle 3 passes through a peripheral area (second peripheral area A2) of the stopped vehicle 10. The risk estimation apparatus 1 includes: a peripheral state data acquisition unit (state detection apparatus 4) which acquires peripheral state data D_info indicating a peripheral state in the traveling direction of the host vehicle 3; a position relation acquisition unit (ECU 2) which acquires a position relation between the oncoming vehicle 12 and the stopped vehicle 10 based on the peripheral state data D_info; and a risk estimation unit (ECU 2, STEP 60 to STEP 64) which estimates, when the oncoming vehicle 12 is positioned on a depth side of the traveling direction of the host vehicle 3 with respect to the stopped vehicle 10, that the risk of appearance Risk_ap is low when a distance (intervehicular distance D3 in a front-and-back direction) between the oncoming vehicle 12 and the stopped vehicle 10 in the traveling direction has a value smaller than a third predetermined value D3ref compared with a case in which the distance in the traveling direction has a value equal to or larger than the third predetermined value D3ref.

According to the risk estimation apparatus of the sixth aspect, the peripheral state data indicating the peripheral state in the traveling direction of the host vehicle is acquired and, based on this peripheral state data, the position relation between the oncoming vehicle and the stopped vehicle is acquired. And, when the oncoming vehicle is positioned on a depth side of the traveling direction of the host vehicle with respect to the stopped vehicle, it is estimated that the risk of appearance is low when the distance between the oncoming vehicle and the stopped vehicle in the traveling direction has a value smaller than the third predetermined value compared with the case in which the distance in the traveling direction has a value equal to or larger than the third predetermined value.

In this case, the oncoming vehicle travels in an opposite direction of the traveling direction of the host vehicle. Therefore, if a traffic participant is present in the peripheral area of the stopped vehicle, the traffic participant recognizes the presence of the oncoming vehicle prior to the host vehicle. Thus, if the distance between the oncoming vehicle and the stopped vehicle in the traveling direction is short, it can be estimated that the possibility of appearance of a traffic participant in an area ahead of the host vehicle is low compared with a case in which this distance is long. Therefore, by appropriately setting this third predetermined value, the degree of the risk of appearance of a traffic participant can be appropriately estimated in accordance with the length of the distance between the oncoming vehicle and the stopped vehicle in the traveling direction ("opposing lane" in the specification is not limited to one lane, and the present disclosure includes a plurality of opposing lanes aligned).

According to a seventh aspect of the present disclosure, in the risk estimation apparatus 1 according to the sixth aspect, when a distance D4 between the oncoming vehicle 12 and the stopped vehicle 10 in a vehicle-width direction has a value smaller than a fourth predetermined value D4ref, the risk estimation unit may estimate that the risk of appearance Risk_ap is low compared with a case in which the distance D4 in the vehicle-width direction has a value equal to or larger than the fourth predetermined value D4ref (STEP 61 to STEP 63).

According to the risk estimation apparatus of the seventh aspect, when the distance between the oncoming vehicle and the stopped vehicle in the vehicle-width direction has a value smaller than the fourth predetermined value, it is estimated that the risk of appearance is low compared with the case in which the distance in the vehicle-width direction has a value equal to or larger than the fourth predetermined value. Generally speaking, if a traffic participant is present in the peripheral area of the stopped vehicle, to avoid this, it is estimated that the oncoming vehicle travels so that the distance between the oncoming vehicle and the stopped vehicle in the vehicle-width direction is long compared with a case in which no traffic participant is present. That is, the distance between the oncoming vehicle and the stopped vehicle in the vehicle-width direction is estimated as indicating the presence or absence of a traffic participant in the peripheral area of the stopped vehicle. Therefore, by appropriately setting this fourth predetermined value, the degree of the risk of appearance of a traffic participant can be appropriately estimated in accordance with the comparison result between the distance between the oncoming vehicle and the stopped vehicle in the vehicle-width direction and the fourth predetermined value.

According to an eighth aspect of the present disclosure, the risk estimation apparatus 1 according to the sixth or seventh aspect may further include a lighting determination unit (ECU 2) which determines whether a headlamp of the oncoming vehicle 12 has been lit. If the headlamp of the oncoming vehicle 12 has been lit, the risk estimation unit may estimate that the risk of appearance Risk_ap is low compared with a case in which the headlamp of the oncoming vehicle 12 has nor been lit (STEP 65 to STEP 69).

According to the risk estimation apparatus of the eighth aspect, if the headlamp of the oncoming vehicle has been lit, it is estimated that the risk of appearance is low compared with the case in which the headlamp of the oncoming vehicle has not been lit. In this case, if the headlamp of the oncoming vehicle has been lit, the degree of recognizing the oncoming vehicle is higher than that at the time of non-lit, and it can thus be estimated that the risk of appearance of a traffic participant is decreased. Therefore, the degree of the risk of appearance of a traffic participant can be appropriately estimated in accordance with the presence or absence of lighting of the headlamp of the oncoming vehicle.

According to a ninth aspect of the present disclosure, the risk estimation apparatus 1 according to the eighth aspect may further include a luminance acquisition unit (state detection apparatus 4) which acquires a luminance Lu around the host vehicle 3. If the luminance Lu is smaller than a predetermined luminance Lref on condition that the headlamp of the oncoming vehicle 12 has been lit, the risk estimation unit may estimate that the risk of appearance Risk_ap is low compared with a case in which the luminance Lu is equal to or larger than the predetermined luminance Lref on condition that the headlamp of the oncoming vehicle 12 has been lit.

According to the risk estimation apparatus of the ninth, aspect, if the luminance is smaller than the predetermined luminance on condition that the headlamp of the oncoming vehicle has been lit, it is estimated that the risk of appearance is low compared with the case in which the luminance is equal to or larger than the predetermined luminance on condition that the headlamp of the oncoming vehicle has been lit. In this case, if the luminance is low, the degree of recognizing the headlamp is further increased compared with a case in which the luminance is high, and it can thus be estimated that the risk of appearance of a traffic participant is further decreased. Therefore, by appropriately setting this predetermined luminance, the degree of the risk of appearance of a traffic participant can be appropriately estimated in accordance with the comparison result between the luminance and the predetermined luminance.

An automated driving apparatus according to a tenth aspect of the present disclosure includes: the risk estimation apparatus 1 according to any one of the first to ninth aspects; and a control unit/controller (ECU 2, STEP 1 to STEP 7) which performs automated driving control of the host vehicle 3 when the host vehicle 3 passes through the peripheral area (first peripheral area A1, second peripheral area A2) of the stopped vehicle 10 in accordance with the risk of appearance Risk_ap estimated by the risk estimation apparatus 1.

According to the automated driving apparatus of the tenth aspect, when the host vehicle passes through the peripheral area of the stopped vehicle, automated driving control of the host vehicle is performed in accordance with the risk of appearance estimated by the risk estimation apparatus. Thus, in accordance with the degree of the risk of appearance, automated driving control of the host vehicle can be appropriately performed.

An automated driving apparatus according to an eleventh aspect of the present disclosure includes: the risk estimation apparatus 1 according to any one of the first to fifth aspects; and a control unit (ECU 2, STEP 1 to STEP 6) which performs automated driving control of the host vehicle 3 when the distance (intervehicular distance D1 in a front-and-back direction) between the host vehicle 3 and the vehicle in front 11 in the traveling direction has a value equal to or larger than the first predetermined value D1ref before the vehicle in front 11 travels the peripheral area (first peripheral area A1) so that the distance in the traveling direction has a value smaller than the first predetermined value D1ref.

According to the automated driving apparatus of the eleventh aspect, when the distance between the host vehicle and the vehicle in front in the traveling direction has a value equal to or larger than the first predetermined value before the vehicle in front travels the peripheral area, automated driving control of the host vehicle is performed so that the distance in the traveling direction has a value smaller than the first predetermined value. Thus, the risk of appearance when the host vehicle passes through the peripheral area of the stopped vehicle can be decreased. The word "unit" used in this application may mean a physical part or component of computer hardware or any device including a controller, a processor, a memory, etc., which is particularly configured to perform functions and steps disclosed in the application.

DESCRIPTION OF THE PREFERRED EMBODIMENTS

In the following, the risk estimation apparatus and the automated driving apparatus according to one embodiment of the present disclosure will be described with reference to the drawings. Since the automated driving apparatus of the present embodiment also serves as a risk estimation apparatus, the automated driving apparatus is described in the following and, in that description, the functions and structure of the risk estimation apparatus are also described.

Figure 1:
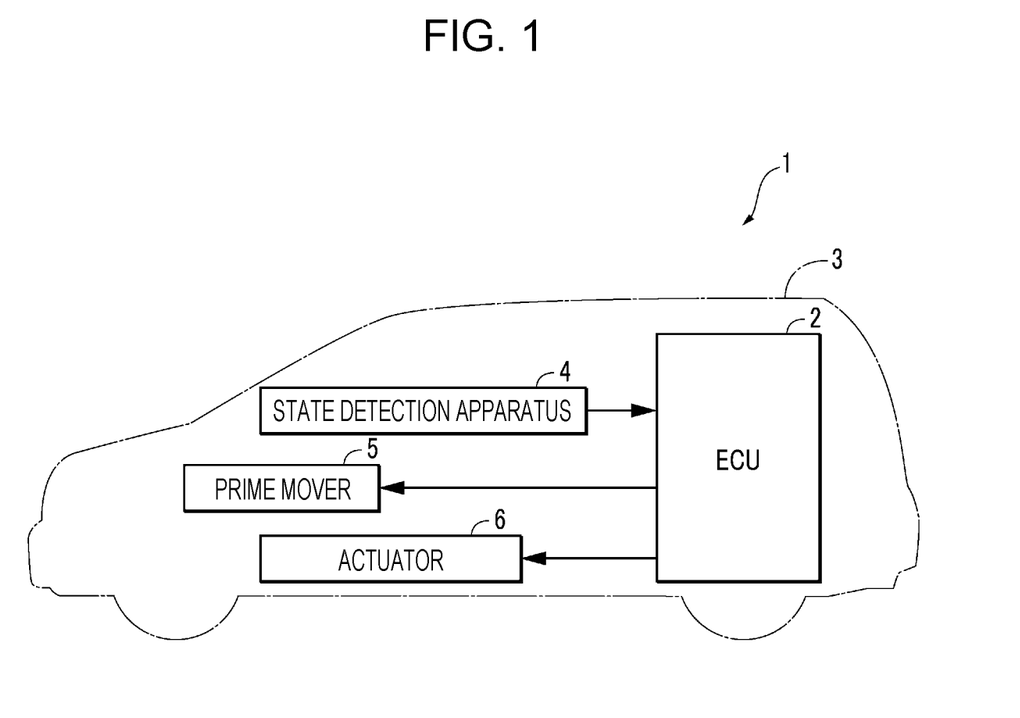
FIG. 1 is a diagram schematically depicting the structure of an automated driving apparatus according to one embodiment of the present disclosure and a vehicle to which the automated driving apparatus is applied.

As depicted in FIG. 1, this automated driving apparatus 1 is applied to a four-wheel vehicle (hereinafter referred to as a "host vehicle") 3, which includes an ECU 2. To this ECU 2, a state detection apparatus 4, a prime mover 5, and an actuator 6 are electrically connected.

This state detection apparatus A is configured of a camera, a millimeter wave radar, an LIDAR, a sonar, a GPS, a luminance sensor, various sensors, and the like and outputs, to the ECU 2, peripheral state data D_info indicating a position of the host vehicle 3 and a peripheral state (such as a traffic environment and a traffic participant) in a traveling direction of the host vehicle 3. This peripheral state data D_info includes a luminance Lu around the host vehicle 3 as data. In the present embodiment, the state detection apparatus 4 corresponds to a peripheral state data acquisition unit and a luminance acquisition unit.

As will be described further below, the ECU 2 recognizes a position of the host vehicle 3, a traffic environment around the host vehicle 3, and so forth based on the peripheral state data D_info from this state detection apparatus 4, and estimates a risk of appearance Risk_ap in the traveling direction of the host vehicle 3.

This risk of appearance Risk_ap indicates a risk of appearance of a traffic participant in a front area of the host vehicle 3 from a stopped vehicle side while the host vehicle 3 is traveling, and is set to have a larger value as the possibility of appearance of a traffic participant in the front area of the host vehicle 3 from the stopped vehicle side is higher.

The prime mover 5 is configured of, for example, an electric motor. As will be described further below, when a traveling course of the host vehicle 3 is determined, the output of the prime mover 5 is controlled by the ECU 2 so that the host vehicle 3 travels on this traveling course.

The actuator 6 is configured of an actuator for braking, an actuator for steering, and so forth. As will be described further below, when a traveling course of the host vehicle 3 is determined, the operation of the actuator 6 is controlled by the ECU 2 so that the host vehicle 3 travels on this traveling course.

Meanwhile, the ECU 2 is configured of a microcomputer formed of, for example, a CPU, a RAM, a ROM, an E2PROM, an I/O interface, and various electrical circuits (any of these are not depicted). As will be described further below, the ECU 2 performs various control processes such as an automated driving control process based on the peripheral state data D_info from the state detection apparatus 4 described above and so forth.

In the present embodiment, the ECU 2 corresponds to a position relation acquisition unit, a risk estimation unit, a lighting determination unit, and a control unit.

Next, the automated driving control process of the present embodiment is described with reference to FIG. 2. As will be described below, this automated driving control process calculates the risk of appearance Risk_ap and performs automated driving control over the host vehicle 3 by using this risk of appearance Risk_ap, and is performed by the ECU 2 at predetermined control intervals.

In the following description, it is assumed that various values to be calculated are stored in the E2PROM of the ECU 2. Also in the following description, an example is described in which the traveling direction of the host vehicle 3 is oriented forward. Furthermore, various determinations in the following description are made based on the peripheral state data D_info.

Figure 2:
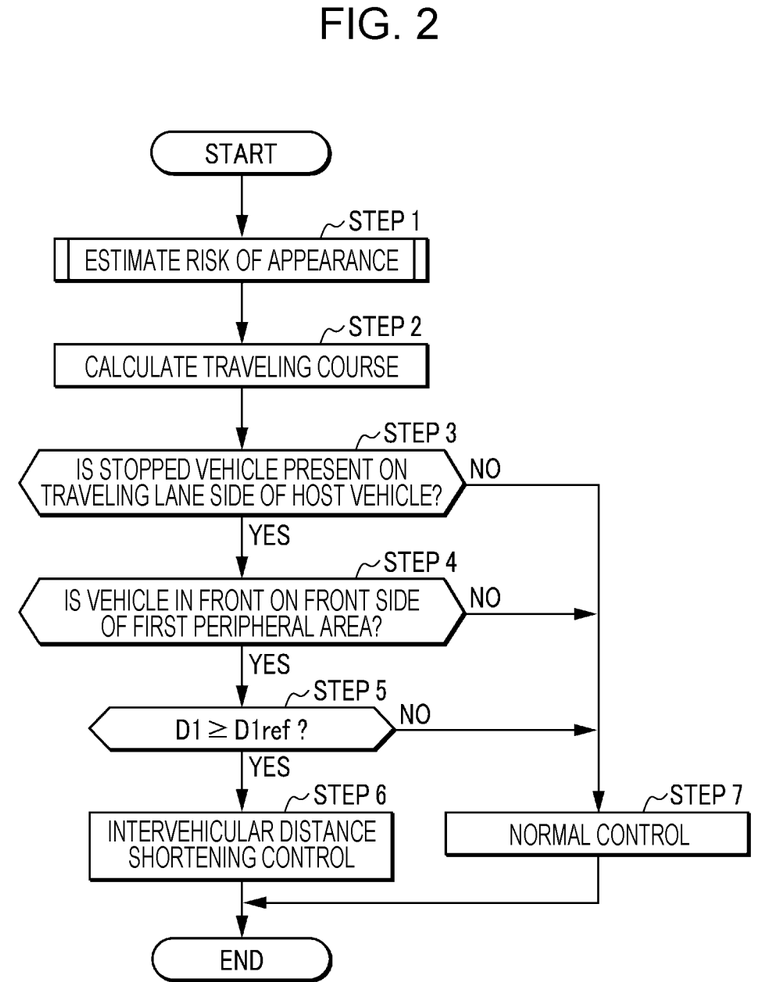
FIG. 2 is a flowchart of an automated driving control process.

As depicted in FIG. 2, a risk-of-appearance estimation process is first performed (FIG. 2/STEP 1). This risk-of-appearance estimation process is to calculate (estimate) the risk of appearance Risk_ap and, specifically, is performed as depicted in FIG. 3.

Figure 3:
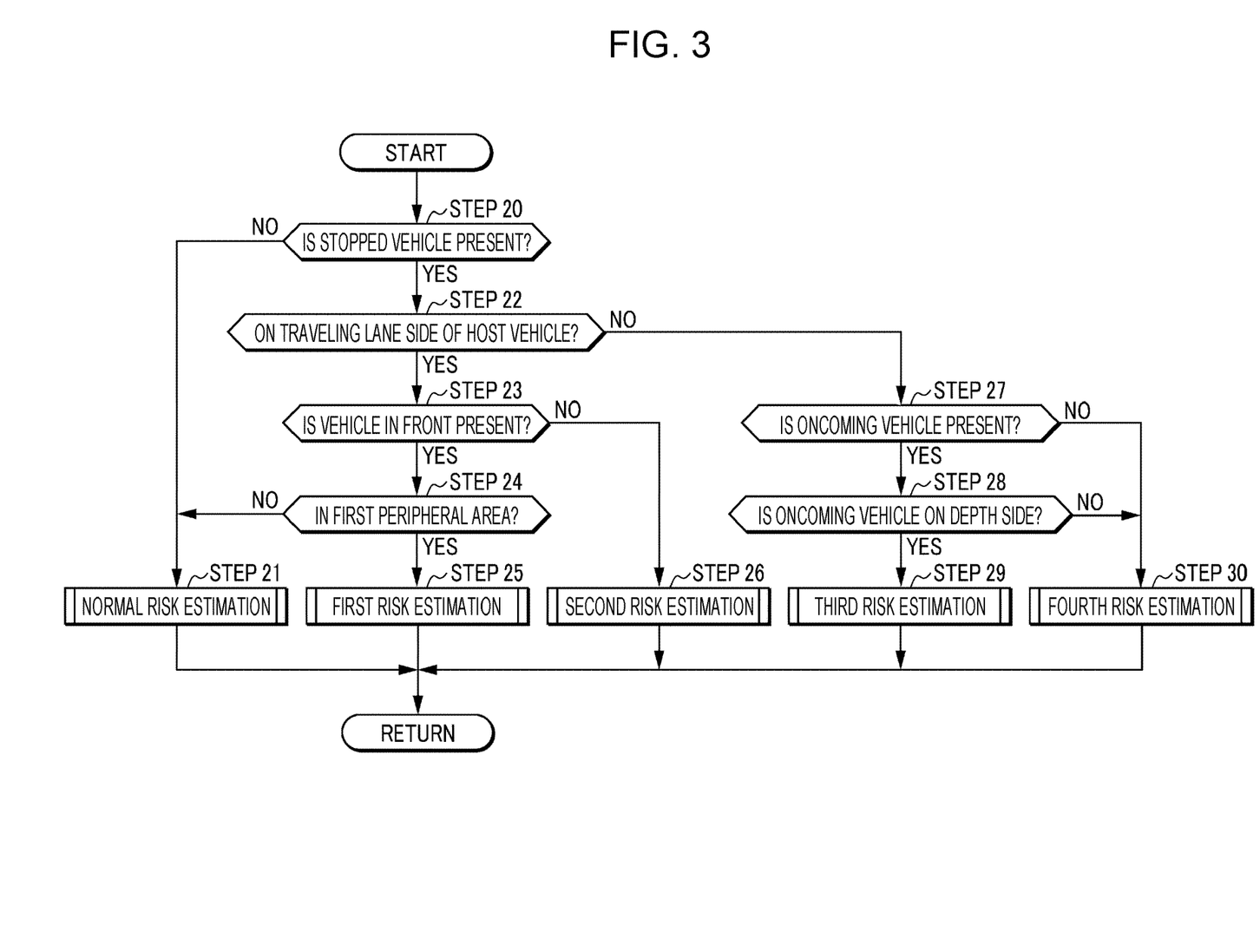
FIG. 3 is a flowchart of a risk-of-appearance estimation process.

As depicted in FIG. 3, it is determined whether the stopped vehicle 10 (refer to FIG. 6 to FIG. 8) is present in a predetermined area ahead of the host vehicle 3 (FIG. 3/STEP 20). This predetermined area is set as an area positioned a predetermined distance ahead of the host vehicle 3 and allowing the stopped vehicle 10 to be reliably recognized based on the peripheral state data D_info.

If this determination is negative (FIG. 3/STEP 20: NO), that is, if the stopped vehicle 10 is not present in the predetermined area ahead of the host vehicle 3, a normal risk estimation process is performed (FIG. 3/STEP 21).

In this normal risk estimation process, the risk of appearance Risk_ap ahead of the host vehicle 3 is calculated based on the traveling environment, the traffic participant, and so forth in the peripheral state data D_info. After the normal risk estimation process is performed in the above-described manner, the process ends.

On the other hand, if the above-described determination is positive (FIG. 3/STEP 20: YES) and the stopped vehicle 10 is present in the predetermined area ahead of the host vehicle 3, it is determined whether the stopped vehicle 10 is positioned on a traveling lane side of the host vehicle 3 (FIG. 3/STEP 22).

If this determination is positive (FIG. 3/STEP 22: YES) and the stopped vehicle 10 is positioned on the traveling lane side of the host vehicle 3, it is determined whether a vehicle in front 11 (refer to FIG. 6 and FIG. 8) is positioned on a traveling lane side of the host vehicle 3 (FIG. 3/STEP 23).

If this determination is positive (FIG. 3/STEP 23: YES), that is, if the stopped vehicle 10 and the vehicle in front 11 are present on the traveling lane side of the host vehicle 3, it is determined whether the vehicle in front 11 is positioned in a first peripheral area A1 (FIG. 3/STEP 24).

Figure 6:
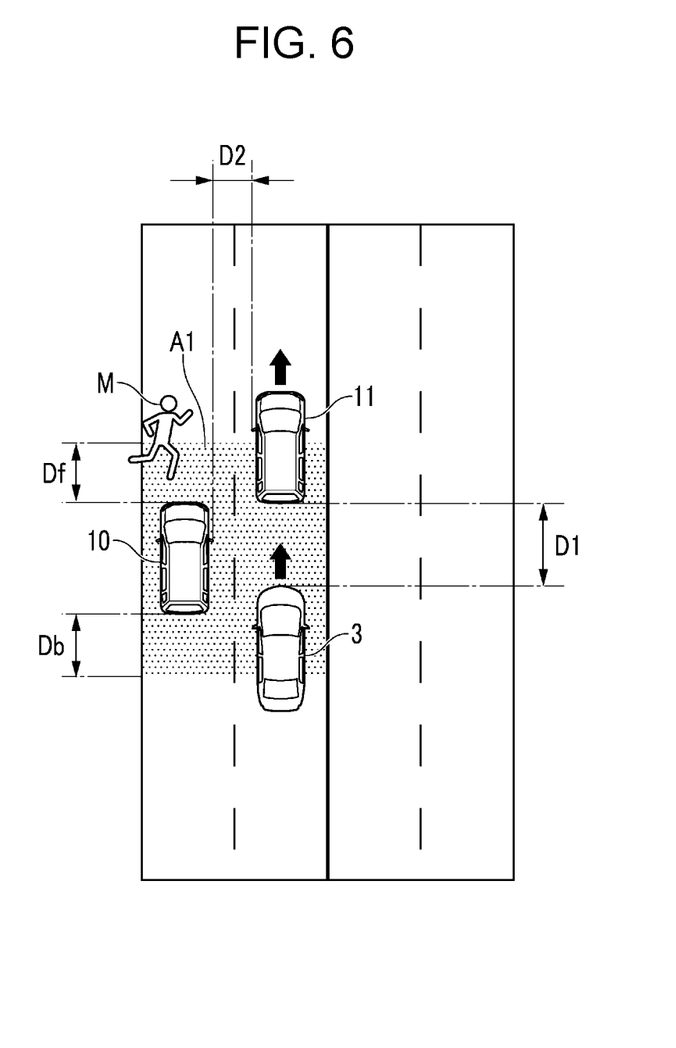
FIG. 6 is a diagram depicting one example when a vehicle in front and a stopped vehicle are present on a traveling lane side of a host vehicle.

This first peripheral area A1 is defined as, for example, a rectangular dotted area depicted in FIG. 6. In this case of FIG. 6, the vertical direction in FIG. 6 corresponds to a front-and-back direction. As depicted in FIG. 6, the first peripheral area A1 is defined as an area surrounded by a straight line extending in a lateral direction at a position behind the rear end of the stopped vehicle 10 by a predetermined distance Db, a straight line extending in the lateral direction at a position ahead of the front end of the stopped vehicle 10 by a predetermined distance Df, a center line of a traveling road, and a boundary line on a road shoulder side of the traveling road.

In this determination process, if at least part of the vehicle in front 11 planarly overlaps the first peripheral area A1, it is determined that the vehicle in front 11 is positioned in the first peripheral area A1. Otherwise, it is determined that the vehicle in front 11 is not positioned in the first peripheral area A1.

If the above-described determination is negative (FIG. 3/STEP 24: NO), the normal risk estimation process is performed (FIG. 3/STEP 21) as described above, and the process ends.

On the other hand, if the above-described determination is positive (FIG. 3/STEP 24: YES) and the vehicle in front 11 is positioned in the first peripheral area A1, a first risk estimation process is performed (FIG. 3/STEP 25).

In this first risk estimation process, based on a position relation among the host vehicle 3, the stopped vehicle 10, and the vehicle in front 11, and so forth, a risk of appearance of a traffic participant (for example, a pedestrian M depicted in FIG. 5 and FIG. 7) in a front area of the host vehicle 3 from the periphery of the stopped vehicle 10 when the host vehicle 3 travels the above-described first peripheral area A1 is calculated as the risk of appearance Risk_ap. Specifically, the first risk estimation process is performed as depicted in FIG. 4.

Figure 4:
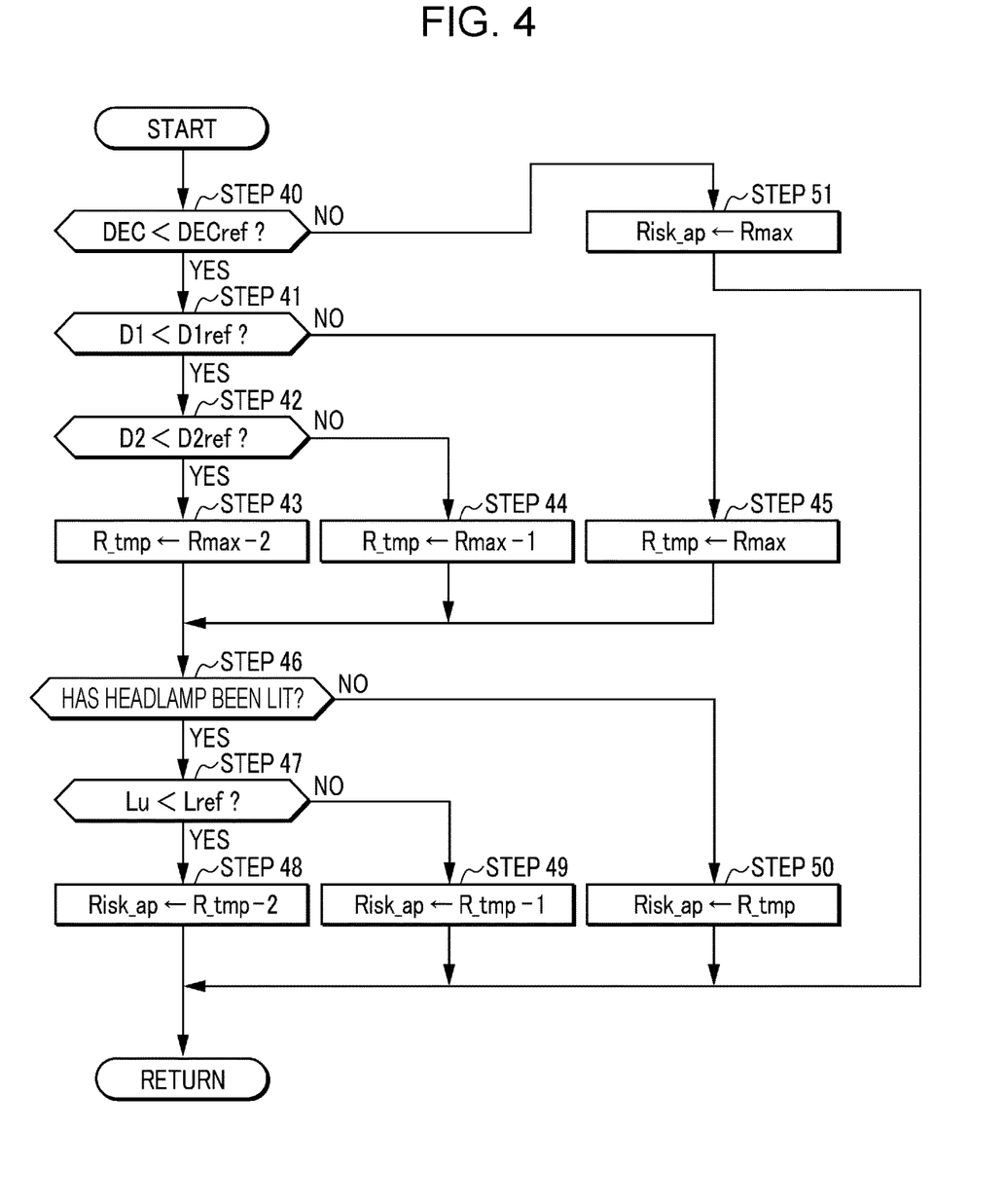
FIG. 4 is a flowchart of a first risk estimation process.

As depicted in FIG. 4, it is first determined whether a deceleration DEC of the vehicle in front 11 is smaller than a predetermined deceleration DECref (FIG. 4/STEP 40). This deceleration DEC corresponds to a difference between the previous value and the current value of the vehicle speed of the vehicle in front 11, and the predetermined deceleration DECref is a predetermined positive value for determining whether the risk of appearance Risk_ap has become high.

If this determination is negative (FIG. 4/step 40: NO) and DEC≥DECref holds, it is determined that the possibility of appearance of a traffic participant in the front area of the host vehicle 3 when the host vehicle 3 passes on the side of the stopped vehicle 10, and the risk of appearance Risk_ap is set at a predetermined maximum value Rmax (FIG. 4/STEP 51). Then, the process ends. This maximum value Rmax is set as a predetermined positive maximum value of the risk of appearance Risk_ap.

On the other hand, if this determination is positive (FIG. 4/STEP 40: YES) and DEC<DECref holds, it is determined whether an intervehicular distance D1 between the host vehicle 3 and the vehicle in front 11 in the front-and-back direction (refer to FIG. Z) has a value smaller than a first predetermined value D1ref (FIG. 4/STEP 41).

If this determination is negative (FIG. 4/STEP 41: NO) and D1≥D1ref, a temporary value R_tmp of the risk of appearance is set at a maximum value Rmax (FIG. 4/STEP 45).

On the other hand, if this determination is positive (FIG. 4/STEP 41: YES) and D1≥D1ref holds, it is determined whether an intervehicular distance D2 between the stopped vehicle 10 and the vehicle in front 11 in a vehicle-width direction (refer to FIG. 6) has a value smaller than a second predetermined value D2ref (FIG. 4/STEP 42).

If this determination is positive (FIG. 4/STEP 42: YES) and D2<D2ref holds, the temporary value R_tmp of the risk of appearance is set at a value Rmax−2 acquired by subtracting a value of 2 from the maximum value Rmax (FIG. 4/STEP 43).

On the other hand, if this determination is negative (FIG. 4/STEP 42: NO) and D2≥D2ref holds, the temporary value R_tmp of the risk of appearance is set at a value Rmax−1 acquired by subtracting a value of 1 from the maximum value Rmax (FIG. 4/STEP 44).

As described above, after the temporary value R_tmp of the risk of appearance is set, it is determined whether a headlamp of the vehicle in front 11 has been lit (FIG. 4/STEP 46). If this determination is negative (FIG. 4/STEP 46: NO) and the headlamp of the vehicle in front 11 is in a lit-out state, the risk of appearance Risk_ap is set at the temporary value R_tmp of the risk of appearance (FIG. 4/STEP 50). Then, the process ends.

On the other hand, if this determination is positive (FIG. 4/STEP 46: YES) and the headlamp of the vehicle in front 11 has been lit, it is determined whether a luminance Lu around the host vehicle 3 is smaller than a predetermined luminance Lref (FIG. 4/STEP 47). This predetermined luminance Lref is a value for determining whether the periphery of the host vehicle 3 is dark and in a state allowing the headlamp to be visually recognizable more easily.

If this determination is positive (FIG. 4/STEP 47: YES) and Lu<Lref holds, the risk of appearance Risk_ap is set at a value R_tmp−2 acquired by subtracting a value of 2 from the temporary value R_tmp of the risk of appearance (FIG. 4/STEP 48). Then, the process ends.

On the other hand, if this determination is negative (FIG. 4/STEP 47: NO) and Lu≥Lref holds, the risk of appearance Risk_ap is set at a value R_tmp−1 acquired by subtracting a value of 1 from the temporary value R_tmp of the risk of appearance (FIG. 4/STEP 49). Then, the process ends.

Referring back to FIG. 3, after the first risk estimation process (FIG. 3/STEP 25) is performed as described above, the risk-of-appearance estimation process ends.

On the other hand, if the above-described determination is negative (FIG. 3/STEP 23: NO) and the vehicle in front 11 is not present on the traveling lane side of the host vehicle 3, a second risk estimation process is performed (FIG. 3/STEP 26).

In this second risk estimation process, the risk of appearance Risk_ap ahead of the host vehicle 3 is calculated based on, for example, the peripheral state of the stopped vehicle 10. After the second risk estimation process is performed in the above-described manner, the process ends.

Also, if the above-described determination is negative (FIG. 3/STEP 22: NO) and the stopped vehicle 10 is positioned on an opposing lane side of the host vehicle 3, it is determined whether an oncoming vehicle is present on the opposing lane side (FIG. 3/STEP 27).

If this determination is positive (FIG. 3/STEP 27: YES), that is, if the stopped vehicle 10 and the oncoming vehicle 12 are present on the opposing lane side (refer to FIG. 7), it is determined whether the oncoming vehicle 12 is positioned on a depth side (rear side) of the stopped vehicle 10 (FIG. 3/STEP 28).

If this determination is positive (FIG. 3/STEP 28: YES) and the oncoming vehicle 12 is positioned on the depth side of the stopped vehicle 10, a third risk estimation process is performed (FIG. 3/STEP 25).

In this third risk estimation process, based on the position relation among the host vehicle 3, the stopped vehicle 10, and the oncoming vehicle 12, and so forth, a risk of appearance of a traffic participant in a front area of the host vehicle 3 from the periphery of the stopped vehicle 10 when the host vehicle 3 travels the second peripheral area A2 is calculated as the risk of appearance Risk_ap.

Figure 7:
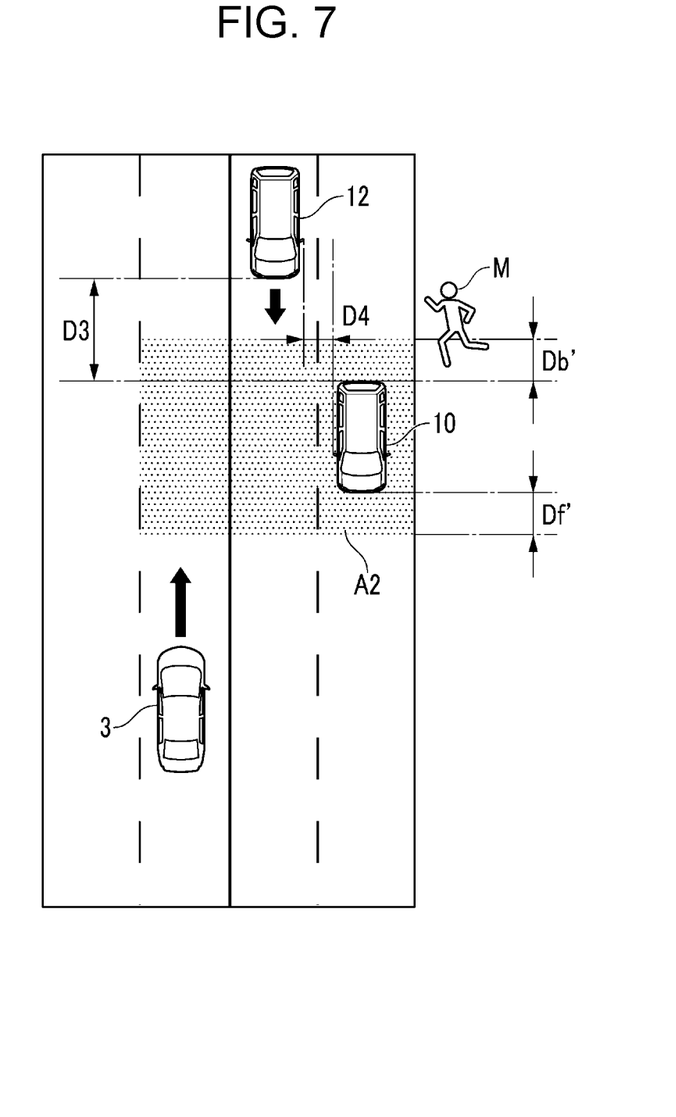
FIG. 7 is a diagram depicting one example when an oncoming vehicle and a stopped vehicle are present on an opposing lane side of the host vehicle.
Figure 8:
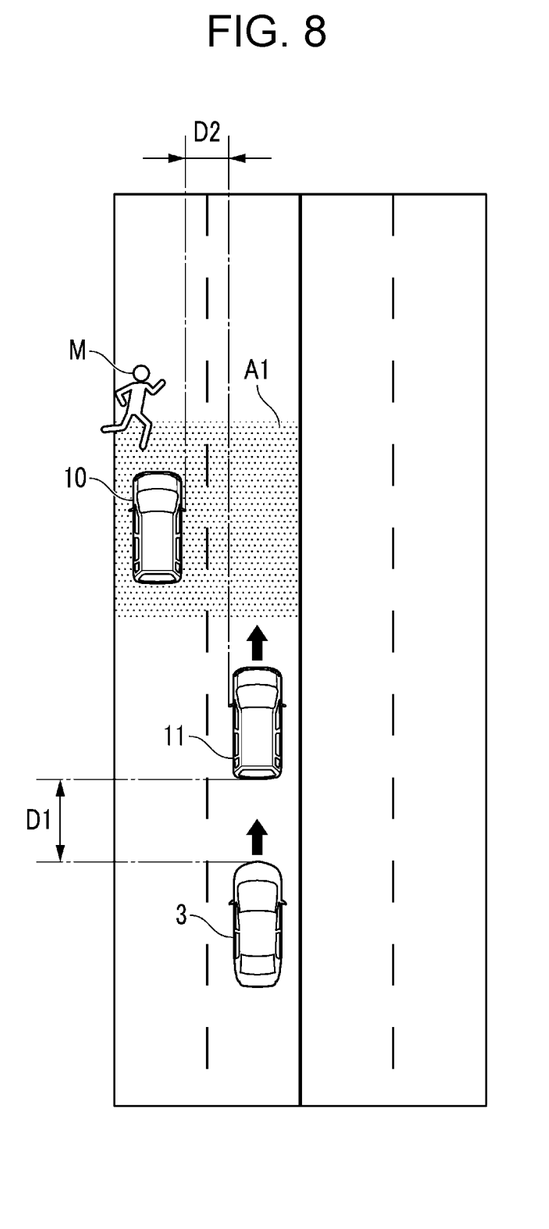
FIG. 8 is a diagram depicting another example when a vehicle in front and a stopped vehicle are present on the traveling lane side of the host vehicle.

This second peripheral area A2 is defined as, for example, a rectangular dotted area depicted in FIG. 7. As depicted in FIG. 7, the second peripheral area A2 is defined as an area surrounded by a straight line extending in a lateral direction at a position behind the rear end of the stopped vehicle 10 by a predetermined distance Db', a straight line extending in the lateral direction at a position ahead of the front end of the stopped vehicle 10 by a predetermined distance Df', a boundary line on a road shoulder side of a traveling lane of the host vehicle 3, and a boundary line on the road shoulder side of a traveling lane of the stopped vehicle 10.

Figure 5:
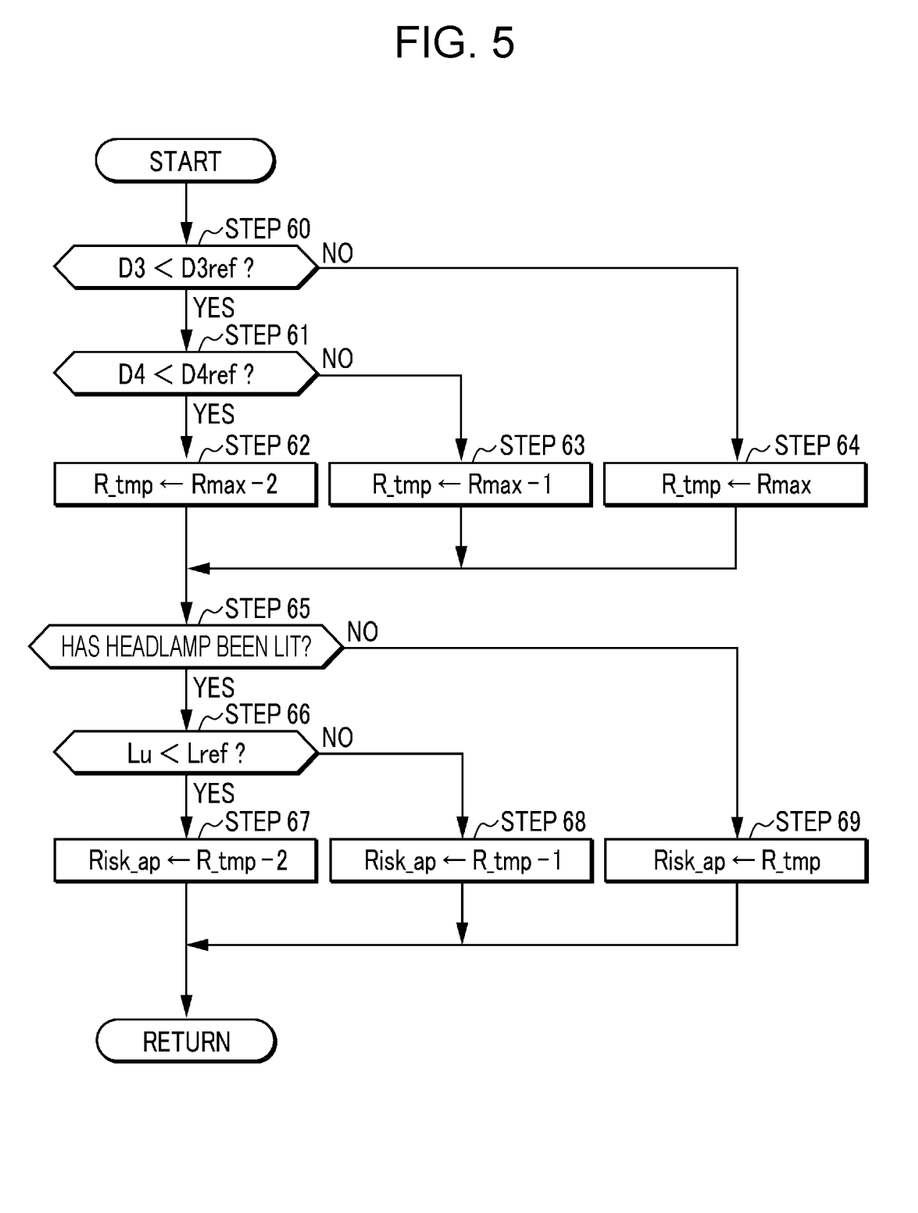
FIG. 5 is a flowchart of a third risk estimation process.

The third risk estimation process is performed specifically as depicted in FIG. 5. As depicted in FIG. 5, it is first determined whether an intervehicular distance D3 between the stopped vehicle 10 and the oncoming vehicle 12 in the front-and-back direction (refer to FIG. 7) has a value smaller than a third predetermined value D3ref (FIG. 5/STEP 60).

If this determination is negative (FIG. 5/STEP 60: NO) and D3≥D3ref holds, the temporary value R_tmp of the risk of appearance is set at the maximum value Rmax (FIG. 5/STEP 64).

On the other hand, if this determination is positive (FIG. 5/STEP 60: YES) and D3<D3ref holds, an intervehicular distance D4 between the stopped vehicle 10 and the oncoming vehicle 12 in the vehicle-width direction (refer to FIG. 7) has a value smaller than a fourth predetermined value D4ref (FIG. 5/STEP 61).

If this determination is positive (FIG. 5/STEP 61: YES) and D4<D4ref holds, the temporary value R_tmp of the risk of appearance is set at the value Rmax−2 acquired by subtracting a value of 2 from the maximum value Rmax (FIG. 5/STEP 62).

On the other hand, if this determination is negative (FIG. 5/STEP 61: NO) and D4≥D4ref holds, the temporary value R_tmp of the risk of appearance is set at the value Rmax−1 acquired by subtracting a value of 1 from the maximum value Rmax (FIG. 5/STEP 63).

As described above, after the temporary value R_tmp of the risk of appearance is set, it is determined whether the headlamp of the oncoming vehicle 12 has been lit (FIG. 5/STEP 65). If this determination is negative (FIG. 5/STEP 65: NO) and the headlamp of the oncoming vehicle 12 is in a lit-out state, the risk of appearance Risk_ap is set at the temporary value R_tmp of the risk of appearance (FIG. 5/STEP 69). Then, the process ends.

On the other hand, if this determination is positive (FIG. 5/STEP 65: YES) and the headlamp of the oncoming vehicle 12 has been lit, it is determined whether the luminance Lu around the host vehicle 3 is smaller than the above-described predetermined luminance Lref (FIG. 5/STEP 66).

If this determination is positive (FIG. 5/STEP 66: YES) and Lu<Lref holds, the risk of appearance Risk_ap is set at the value R_tmp−2 acquired by subtracting a value of 2 from the temporary value R_tmp of the risk of appearance (FIG. 5/STEP 67). Then, the process ends.

On the other hand, if this determination is negative (FIG. 5/STEP 66: NO) and Lu≥Lref holds, the risk of appearance Risk_ap is set at the value R_tmp−1 acquired by subtracting a value of 1 from the temporary value R_tmp of the risk of appearance (FIG. 5/STEP 68). Then, the process ends.

Referring back to FIG. 3, after the third risk estimation process (FIG. 3/STEP 29) is performed as described above, the risk-of-appearance estimation process ends.

On the other hand, if either of the above-described two determinations is negative (FIG. 3/STEP 27 or STEP 28: NO), that is, if the oncoming vehicle 12 is not present on the opposing lane side or if the oncoming vehicle 12 is on a front side of the stopped vehicle 10, a fourth risk estimation process is performed (FIG. 3/STEP 30).

In this fourth risk estimation process, the risk of appearance Risk_ap ahead of the host vehicle 3 is calculated based on the traveling environment, the traffic participant, and so forth in the peripheral state data D_info. After the fourth risk estimation process is performed in the above-described manner, the process ends.

Referring back to FIG. 2, after the risk-of-appearance estimation process (FIG. 2/STEP 1) is performed as described above, a traveling course calculation process is performed (FIG. 2/STEP 2). In this process, based on the risk of appearance Risk_ap calculated as described above and the peripheral state data D_info, a future traveling course of the host vehicle 3 is calculated by the predetermined calculation algorithm as time-series data of a two-dimensional coordinate system. That is, the traveling course is calculated as data defining a position on x and y coordinate axes, a velocity in an x-axis direction, and a velocity in a y-axis direction of the host vehicle 3.

Next, it is determined whether the stopped vehicle 10 is present on the traveling lane side of the host vehicle 3 (FIG. 2/STEP 3). If this determination is positive (FIG. 2/STEP 3: YES) and the stopped vehicle 10 is present on the traveling lane side of the host vehicle 3, it is determined whether the vehicle in front 11 is positioned on a front side of the first peripheral area A1 of the stopped vehicle 10 (FIG. 2/STEP 4).

If this determination is positive (FIG. 2/STEP 4: YES) and the vehicle in front 11 is positioned on the front side of first peripheral area A1 of the stopped vehicle 10 (refer to FIG. 8), it is determined whether a distance D1 between the host vehicle 3 and the vehicle in front 11 in the front-andback direction has a value equal to or larger than the above-described first predetermined value D1ref (FIG. 2/STEP 5).

If this determination is positive (FIG. 2/STEP 5: YES) and D1≥D1ref holds, an intervehicular distance shortening control process is performed (FIG. 2/STEP 6). In this intervehicular distance shortening control process, the traveling course calculated in the above-described traveling course calculation process is corrected so that the distance D1 between the host vehicle 3 and the vehicle in front 11 in the front-and-back direction has a value smaller than the first predetermined value D1ref. Also, the operation states of the prime mover 5 and the actuator 6 are controlled so that the host vehicle 3 travels on the corrected traveling course. After the intervehicular distance shortening control process is performed as described above, the process ends.

On the other hand, if any of the above-described three determinations is negative (FIG. 2/STEP 3, STEP 4, or STEP 5: NO), that is, if the stopped vehicle 10 is not present on the traveling lane side of the host vehicle 3, if the vehicle in front 11 is not positioned on the front side of the first peripheral area A1 of the stopped vehicle 10, of if D1<D1ref holds, a normal control process is performed (FIG. 2/STEP 7).

In this normal control process, the operation states of the prime mover 5 and the actuator 6 are controlled so that the host vehicle 3 travels on the traveling course calculated in the above-described traveling course calculation process. Alter the normal control process is performed as described above, the process ends.

As described above, according to the automated driving apparatus 1 of the present embodiment, it is determined, based on the peripheral state data D_info, whether the stopped vehicle 10 and the vehicle in front 11 are present on the traveling lane side ahead of the host vehicle 3. Then, when the stopped vehicle 10 and the vehicle in front 11 are present on the traveling lane side ahead of the host vehicle 3 and the vehicle in front 11 is positioned in the first peripheral area A1 (the case depicted in FIG. 6), if the intravehicular distance D1 between the host vehicle 3 and the vehicle in front 11 in the front-and-back direction has a value smaller than the first predetermined value D1ref, the risk of appearance Risk_ap is set at a small value compared with a case in which the intravehicular distance D1 has a value equal to or larger than the first predetermined value D1ref.

In this case, the vehicle in front 11 travels, ahead of the host vehicle 3, the first peripheral area A1 of the stopped vehicle 10, if a traffic participant is present in the peripheral area of the stopped vehicle 10, the traffic participant recognizes the presence of the vehicle in front 11 prior to the host vehicle 3. Thus, if the intervehicular distance D1 between the host vehicle 3 and the vehicle in front 11 is short, it can be estimated that the risk of appearance Risk_ap of a traffic participant is low compared with a case in which this intervehicular distance D1 is long. Therefore, by appropriately setting this first predetermined value D1ref, the risk of appearance Risk_ap can be appropriately calculated (set) in accordance with the length of the intervehicular distance D1 between the host vehicle 3 and the vehicle in front 11.

Also, when the vehicle in front 11 is positioned in the first peripheral area A1, if the intervehicular distance D2 between the vehicle in front 11 and the stopped vehicle 10 in the vehicle-width direction has a value smaller than the second predetermined value D2ref, the risk of appearance Risk_ap is set as a small value compared with a case in which the intervehicular distance D2 has a value equal to or larger than the second predetermined value D2ref. In this case, if a traffic participant is present in the first peripheral area A1 of the stopped vehicle 10, to avoid this, it is estimated that the vehicle in front 11 travels so that the distance between the vehicle in front 11 and the stopped vehicle 10 in the vehicle-width direction is long compared with a case in which no traffic participant is present. Therefore, by appropriately setting this second predetermined value D2ref, the risk of appearance Risk_ap of a traffic participant can be appropriately calculated in accordance with the comparison result between the intervehicular distance D2 between the vehicle in front 11 and the stopped vehicle 10 in the vehicle-width direction and the second predetermined value D2ref.

Furthermore, if the headlamp of the vehicle in front 11 has been lit, the risk of appearance Risk_ap is set at a small value compared with a case in which the headlamp of the vehicle in front 11 has not been lit. In this case, if the headlamp of the vehicle in front 11 has been lit, the degree of recognizing the vehicle in front 11 is higher than that at the time of non-lit, and it can thus be estimated that the risk of appearance Risk_ap of a traffic participant is decreased. Therefore, the risk of appearance Risk_ap of a traffic participant can be appropriately calculated in accordance with the presence or absence of lighting of the headlamp of the vehicle in front 11.

In addition, if the luminance Lu is smaller than the predetermined luminance L-ref on condition that the headlamp of the vehicle in front 11 has been lit, it is estimated that the risk of appearance Risk_ap is low compared with a case in which the luminance Lu is equal to or larger than the predetermined luminance Lref on condition that the headlamp of the vehicle in front 11 has been lit. In this case, if the luminance Lu is low, the degree of recognizing the vehicle in front 11 is further increased compared with a case in which the luminance Lu is high, and it can thus be estimated that the risk of appearance Risk_ap of a traffic participant is further decreased. Therefore, by appropriately setting this predetermined luminance Lref, the risk of appearance Risk_ap of a traffic participant can be appropriately calculated in accordance with the comparison result between the luminance Lu and the predetermined luminance Lref.

Also, if the deceleration DEC when the vehicle in front 11 travels the first peripheral area A1 becomes equal to or higher than the predetermined deceleration DECref, it is estimated that the risk of appearance Risk_ap is high compared with a case in which the deceleration DEC is smaller than the predetermined deceleration DECref. Generally speaking, if the deceleration DEC when the vehicle in front 11 travels the first peripheral area A1 of the stopped vehicle 10 is large, it is estimated that the possibility that the vehicle in front 11 has recognized a traffic participant and decelerated. Thus, it can be estimated that the risk of appearance Risk_ap of a traffic participant is high compared with a case in which the deceleration DEC is small. Therefore, by appropriately setting this predetermined deceleration DECref, the risk of appearance Risk_ap of a traffic participant can be appropriately calculated in accordance with the comparison result between the deceleration DEC when the vehicle in front 11 passes on the side of the stopped vehicle 10 and the predetermined deceleration DECref.

Furthermore, based on the peripheral state data D_info, it is determined whether the stopped vehicle 10 and the oncoming vehicle 12 are present on the opposing lane side ahead of the host vehicle 3. Then, when the stopped vehicle 10 and the oncoming vehicle 12 are present on the opposing lane side ahead of the host vehicle 3 and the oncoming vehicle 12 is positioned on an opposite side of the second peripheral area A2 (the case depicted in FIG. 7), if an intervehicular distance D3 between the stopped vehicle 10 and the oncoming vehicle 12 in the front-and-back direction has a value smaller than the third predetermined value D3ref, the risk of appearance Risk_ap is set at a small value compared with a case in which the intervehicular distance D3 has a value equal zo or larger than the third predetermined value D3ref.

In this case, the oncoming vehicle 12 travels in an opposite direction of the traveling direction of the host vehicle 3. Therefore, if a traffic participant is present in the second peripheral area A2 of the stopped vehicle 10, the traffic participant recognizes the presence of the oncoming vehicle 12 prior to the host vehicle 3. Thus, if the intervehicular distance D3 between the oncoming vehicle 12 and the stopped vehicle 10 in the front-and-back direction is short, it can be estimated that the possibility of appearance of a traffic participant in an area ahead of the host vehicle 3 is low compared with a case in which this intervehicular distance D3 is long. Therefore, by appropriately setting this third predetermined value D3ref, the risk of appearance Risk_ap of a traffic participant can be appropriately calculated in accordance with the length of the intervehicular distance D3 between the oncoming vehicle 12 and the stopped vehicle 10 in the front-and-back direction.

Also, when an intervehicular distance D4 between the oncoming vehicle 12 and the stopped vehicle 10 in the vehicle-width direction has a value smaller than the fourth predetermined value D4ref, the risk of appearance Risk_ap is set at a small value compared with a case in which the intervehicular distance D4 in the vehicle-width direction has a value equal to or larger than the fourth predetermined value D4ref. Generally speaking, if a traffic participant is present in the second peripheral area A2 of the stopped vehicle 10, to avoid this, it is estimated that the oncoming vehicle 12 travels so that the intervehicular distance D4 between the oncoming vehicle 12 and the stopped vehicle 10 in the vehicle-width direction is long compared with a case in which no traffic participant is present. That is, the intervehicular distance D4 between the oncoming vehicle 12 and the stopped vehicle 10 in the vehicle-width direction is estimated as indicating the presence or absence of a traffic participant in the second peripheral area A2 of the stopped vehicle 10. Therefore, by appropriately setting this fourth predetermined value D4ref, the risk of appearance Risk_ap of a traffic participant can be appropriately calculated in accordance with the comparison result between the intervehicular distance D4 between the oncoming vehicle 12 and the stopped vehicle 10 in the vehicle-width direction and the fourth predetermined value D4ref.

Furthermore if the headlamp of the oncoming vehicle 12 has been lit, the risk of appearance Risk_ap is set at a small value compared with a case in which the headlamp of the oncoming vehicle 12 has not been lit. In this case, if the headlamp of the oncoming vehicle 12 has been lit, the degree of recognizing the oncoming vehicle 12 is higher than that at the time of non-lit, and it can thus be estimated that the risk of appearance Risk_ap of a traffic participant is decreased. Therefore, the risk of appearance Risk_ap of a traffic participant can be appropriately calculated in accordance with the presence or absence of lighting of the headlamp of the oncoming vehicle 12.

In addition, if the luminance Lu is smaller than the predetermined luminance Lref on condition that the headlamp of the oncoming vehicle 12 has been lit, the risk of appearance Risk_ap is set an a small value compared with a case in which the luminance Lu is equal to or larger than the predetermined luminance Lref on condition that the headlamp of the oncoming vehicle 12 has been lit. In this case, if the luminance Lu is low, the degree of recognizing the headlamp is further increased compared with a case in which the luminance Lu is high, and it can thus be estimated that the risk of appearance Risk_ap of a traffic participant is further decreased. Therefore, by appropriately setting this predetermined luminance Lref, the risk of appearance Risk_ap of a traffic participant can be appropriately calculated in accordance with the comparison result between the luminance Lu and the predetermined luminance Lref.

Furthermore, when the host vehicle 3 passes through the first peripheral area A1 or the second peripheral area A2 of the stopped vehicle 10, automated driving control of the host vehicle 3 is performed in accordance with the risk of appearance Risk_ap set/calculated as described above. Thus, in accordance with the degree of the risk of appearance Risk_ap, automated driving control of the host vehicle 3 cars be appropriately performed.

In addition, when the intervehicular distance D1 between the host vehicle 3 and the vehicle in front 11 in the front-and-back direction has a value equal to or larger than the first predetermined value D1ref before the vehicle in front 11 travels the first peripheral area A1, automated driving control of the host vehicle 3 is performed so that the intervehicular distance D1 has a value smaller than the first predetermined value D1ref. Thus, the risk of appearance Risk_ap when the host vehicle 3 passes through the first peripheral area A1 of the stopped vehicle 10 can be decreased.

Figure 9:
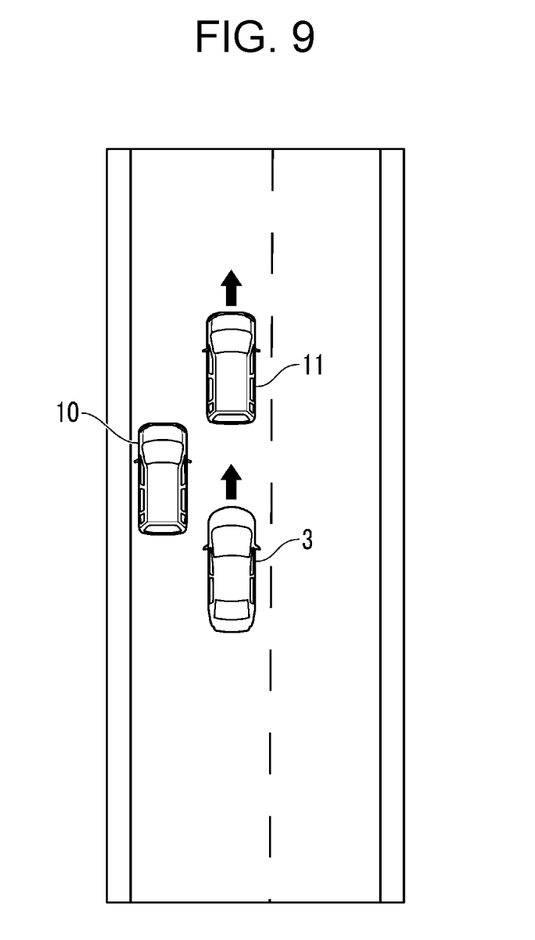
FIG. 9 is a diagram depicting one example when a vehicle in front and a stopped vehicle are present on one traveling lane of the host vehicle.

While the embodiment is an example when the host vehicle 3 travels a traveling road with two lanes on one side, the automated driving apparatus and the risk estimation apparatus of the present disclosure are not limited to be applied to this, but can be applied to cases of traveling a traveling road with one lane or three or more lanes on one side. For example, the automated driving apparatus and the risk estimation apparatus of the present disclosure may be used for traveling a traveling road with one lane on one side as depicted in FIG. 9.

Also, while the embodiment is an example using the first peripheral area A1 depicted in FIG. 6 and the second peripheral area A2 depicted in FIG. 7 as peripheral areas of the stopped vehicle, the peripheral area of the present disclosure is not limited to these, and may be any peripheral area of the stopped vehicle. For example, an area wider or narrower than the first peripheral area A1 depicted in FIG. 6 and the second peripheral area A2 depicted in FIG. 7 may be taken the peripheral area of the stopped vehicle. Furthermore, the shape of the peripheral area is not limited to a rectangular shape but may be a curved shape or a shape that is similar to the planar outer shape of the stopped vehicle and wider than a projected area of the stopped vehicle.

Still further, while the embodiment is an example in which the automated driving apparatus 1 and the risk estimation apparatus 1 of the present disclosure are applied to a four-wheel vehicle, the automated driving apparatus and the risk estimation apparatus of the present disclosure are not limited to this, and can be applied to a two-wheel vehicle, a three-wheel vehicle, and a vehicle with five or more wheels.

Still further, while the embodiment is an example in which the risk estimation apparatus of the present disclosure is applied to an automated driving apparatus which performs automated driving control of the host vehicle 3, the risk estimation apparatus of the present disclosure may be applied to a control apparatus of a vehicle which driven by switching between automated driving control and manual driving by a driver.

What is claimed is:

1. A vehicle, which is a host vehicle, comprising:
   a controller configured to perform automated driving control of the host vehicle;
   a luminance sensor installed in the host vehicle and configured to acquire a luminance around the host vehicle; and
   a risk estimation apparatus configured to estimate, when a stopped vehicle is present in a predetermined area in a traveling direction of the host vehicle and a vehicle in front traveling a peripheral area of the stopped vehicle in the traveling direction is present ahead of the host vehicle, a risk of appearance of a traffic participant in a front area of the host vehicle in which the host vehicle passes through the peripheral area of the stopped vehicle, the risk estimation apparatus comprising:
   a peripheral state data acquisitor configured to acquire peripheral state data indicating a peripheral state in the traveling direction of the host vehicle;
   a position relation acquisitor configured to acquire a position relation between the vehicle in front and the host vehicle based on the peripheral state data; and
   a risk estimator configured to estimate the risk of appearance of the traffic participant to be lower in a case in which a distance between the host vehicle and the vehicle in front in the traveling direction is smaller than a first predetermined value as compared with a case in which the distance in the traveling direction is equal to or larger than the first predetermined value;
   a lighting determinator configured to determine whether a headlamp of the vehicle in front has been lit, wherein when the headlamp of the vehicle in front has been lit, the risk estimator estimates that the risk of appearance is lower as compared with a case in which the headlamp of the vehicle in front has not been lit, wherein
   when the luminance acquired by the luminance sensor is smaller than a predetermined luminance on condition that the headlamp of the vehicle in front has been lit, the risk estimator estimates that the risk of appearance is lower as compared with a case in which the luminance is equal to or larger than the predetermined luminance on condition that the headlamp of the vehicle in front has been lit, and
   the controller is configured to operate the host vehicle based on the risk of appearance of the traffic participant estimated by the risk estimator.

2. The vehicle according to claim 1, wherein
   the position relation acquisitor acquires a position relation between the vehicle in front and the stopped vehicle based on the peripheral state data, and
   when a distance between the vehicle in front and the stopped vehicle in a vehicle-width direction is smaller than a second predetermined value, the risk estimator estimates that the risk of appearance is lower as compared with a case in which the distance in the vehicle-width direction is equal to or larger than the second predetermined value.

3. The vehicle according to claim 1, wherein
   the position relation acquisitor further acquires a vehicle speed of the vehicle in front based on the peripheral state data, and
   when a deceleration of the vehicle in front when traveling the peripheral area becomes equal to or larger than a predetermined deceleration, the risk estimator estimates that the risk of appearance is higher as compared with a case in which the deceleration is smaller than the predetermined deceleration.

4. A vehicle, which is a host vehicle, comprising:
   a controller configured to perform automated driving control of the host vehicle;
   a luminance sensor installed in the host vehicle and configured to acquire a luminance around the host vehicle; and
   a risk estimation apparatus is configured to estimate, when a stopped vehicle is present in a predetermined area in a traveling direction of the host vehicle on an opposing lane side of a road where the host vehicle is traveling and an oncoming vehicle traveling in an opposite direction of the traveling direction of the host vehicle is present on the opposing lane side, a risk of appearance of a traffic participant in a front area of the host vehicle in which the host vehicle passes through a peripheral area of the stopped vehicle, the risk estimation apparatus comprising:
   a peripheral state data acquisitor configured to acquire peripheral state data indicating a peripheral state in the traveling direction of the host vehicle;
   a position relation acquisitor configured to acquire a position relation between the oncoming vehicle and the stopped vehicle based on the peripheral state data; and
   a risk estimator configured to, when the oncoming vehicle is positioned on a depth side of the traveling direction of the host vehicle with respect to the stopped vehicle, estimate the risk of appearance to be lower in a case in which a distance between the oncoming vehicle and the stopped vehicle in the traveling direction is smaller than a third predetermined value as compared with a case in which the distance in the traveling direction is equal to or larger than the third predetermined value;
   a lighting determinator configured to determine whether a headlamp of the vehicle in front has been lit, wherein when the headlamp of the vehicle in front has been lit, the risk estimator estimates that the risk of appearance is lower as compared with a case in which the headlamp of the vehicle in front has not been lit, wherein
   when the luminance acquired by the luminance sensor is smaller than a predetermined luminance on condition that the headlamp of the vehicle in front has been lit, the risk estimator estimates that the risk of appearance is lower as compared with a case in which the luminance is equal to or larger than the predetermined luminance on condition that the headlamp of the vehicle in front has been lit, and
   the controller is configured to operate the host vehicle based on the risk of appearance of the traffic participant estimated by the risk estimator.

5. The vehicle according to claim 4, wherein
   when a distance between the oncoming vehicle and the stopped vehicle in a vehicle-width direction is smaller than a fourth predetermined value, the risk estimator estimates that the risk of appearance is lower as compared with a case in which the distance in the vehicle-width direction is equal to or larger than the fourth predetermined value.

* * * * *